US009279376B2

(12) United States Patent
Bucknell

(10) Patent No.: US 9,279,376 B2
(45) Date of Patent: Mar. 8, 2016

(54) SYSTEM AND METHOD FOR CONTROLLING EXHAUST GAS RECIRCULATION

(75) Inventor: John R. Bucknell, Royal Oak, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1286 days.

(21) Appl. No.: 13/162,860

(22) Filed: Jun. 17, 2011

(65) Prior Publication Data

US 2012/0323469 A1 Dec. 20, 2012

(51) Int. Cl.
*F02B 47/08* (2006.01)
*F02M 25/07* (2006.01)
*F02D 41/00* (2006.01)
*F02D 13/02* (2006.01)

(52) U.S. Cl.
CPC ........ *F02D 41/0062* (2013.01); *F02D 41/0072* (2013.01); *F02D 13/0265* (2013.01); *F02M 25/0715* (2013.01); *F02M 25/0752* (2013.01); *Y02T 10/47* (2013.01)

(58) Field of Classification Search
CPC .......... F02M 25/0707; F02M 25/0709; F02M 25/07; F02M 25/0772; F02D 41/0065; F02D 41/0072; F02D 41/0077
USPC ............. 123/568.2–568.26, 568.14; 701/108; 60/605.2
See application file for complete search history.

(56) References Cited

U.S. PATENT DOCUMENTS

| | | | |
|---|---|---|---|
| 6,513,467 B2 * | 2/2003 | Nohara et al. ............. | 123/90.15 |
| 6,530,351 B2 * | 3/2003 | Mikame ..................... | 123/90.15 |
| 6,745,743 B2 * | 6/2004 | Abo et al. ...................... | 123/295 |
| 6,748,936 B2 * | 6/2004 | Kinomura et al. ........ | 123/568.22 |
| 7,000,380 B2 * | 2/2006 | Tokuyasu et al. ............... | 60/285 |
| 7,392,797 B2 * | 7/2008 | Ogawa et al. ............ | 123/568.14 |
| 7,444,999 B2 * | 11/2008 | Kitamura et al. ........ | 123/568.11 |
| 7,597,089 B2 * | 10/2009 | Endo ........................ | 123/568.14 |
| 7,706,958 B2 * | 4/2010 | Itoga et al. ..................... | 701/108 |
| 7,778,766 B1 * | 8/2010 | Cowgill et al. ................ | 701/108 |
| 7,832,197 B2 * | 11/2010 | Leone .............................. | 60/285 |
| 8,276,551 B2 * | 10/2012 | Ramappan et al. ......... | 123/27 R |
| 8,302,583 B2 | 11/2012 | Nakatani | |
| 2001/0015193 A1 * | 8/2001 | Tanaka et al. ................. | 123/300 |
| 2006/0162689 A1 * | 7/2006 | Winkelman et al. .......... | 123/299 |
| 2008/0041339 A1 * | 2/2008 | Nishikiori et al. ....... | 123/406.48 |
| 2009/0048765 A1 * | 2/2009 | Kang et al. ..................... | 701/108 |
| 2010/0043762 A1 | 2/2010 | Weiss et al. | |
| 2010/0115945 A1 | 5/2010 | Nakatani | |
| 2010/0222985 A1 * | 9/2010 | Yun et al. ...................... | 701/103 |

(Continued)

FOREIGN PATENT DOCUMENTS

JP  2007332913 A  * 12/2007
JP  2008267308 A  * 11/2008

(Continued)

*Primary Examiner* — Thomas Moulis
*Assistant Examiner* — Joseph Dallo

(57) ABSTRACT

A control system for an engine includes first and second modules. The first module estimates a total amount of exhaust gas recirculation (EGR) in the engine, wherein the total amount of EGR includes (i) EGR within cylinders of the engine and (ii) EGR flowing through an EGR system of the engine. The second module selectively controls an overlap of intake and exhaust valve timing in the engine based on (i) a position of an EGR valve in the EGR system and (ii) a comparison of the estimated total amount of EGR in the engine and an EGR threshold.

20 Claims, 3 Drawing Sheets

(56) References Cited

U.S. PATENT DOCUMENTS

2011/0283971 A1* 11/2011 Wermuth et al. ........ 123/406.11
2012/0053822 A1* 3/2012 Kosaka et al. ................ 701/108

FOREIGN PATENT DOCUMENTS

JP 2010031818 A * 2/2010
WO WO-2008/152473 A1 12/2008

* cited by examiner

SYSTEM AND METHOD FOR CONTROLLING EXHAUST GAS RECIRCULATION

FIELD

The present disclosure relates to internal combustion engines and more particularly to a system and method for controlling exhaust gas recirculation (EGR).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an induction system that may be regulated by a throttle. The air is distributed to a plurality of cylinders and combined with fuel to create an air/fuel (A/F) mixture. The A/F mixture is combusted within the cylinders to drive pistons that rotatably turn a crankshaft and generate drive torque. Exhaust gas resulting from combustion is expelled from the cylinders into an exhaust manifold. The exhaust gas may be treated by an exhaust treatment system before being released into the atmosphere. The exhaust gas may also be recirculated (also known as exhaust gas recirculation, or EGR) and combusted during future engine cycles.

SUMMARY

A control system for an engine includes first and second modules. The first module estimates a total amount of exhaust gas recirculation (EGR) in the engine, wherein the total amount of EGR includes (i) EGR within cylinders of the engine and (ii) EGR flowing through an EGR system of the engine. The second module selectively controls an overlap of intake and exhaust valve timing in the engine based on (i) a position of an EGR valve in the EGR system and (ii) a comparison of the estimated total amount of EGR in the engine and an EGR threshold.

A method for controlling an engine includes estimating a total amount of exhaust gas recirculation (EGR) in the engine, wherein the total amount of EGR includes (i) EGR within cylinders of the engine and (ii) EGR flowing through an EGR system of the engine, and selectively controlling an overlap of intake and exhaust valve timing in the engine based on (i) a position of an EGR valve in the EGR system and (ii) a comparison of the estimated total amount of EGR in the engine and an EGR threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
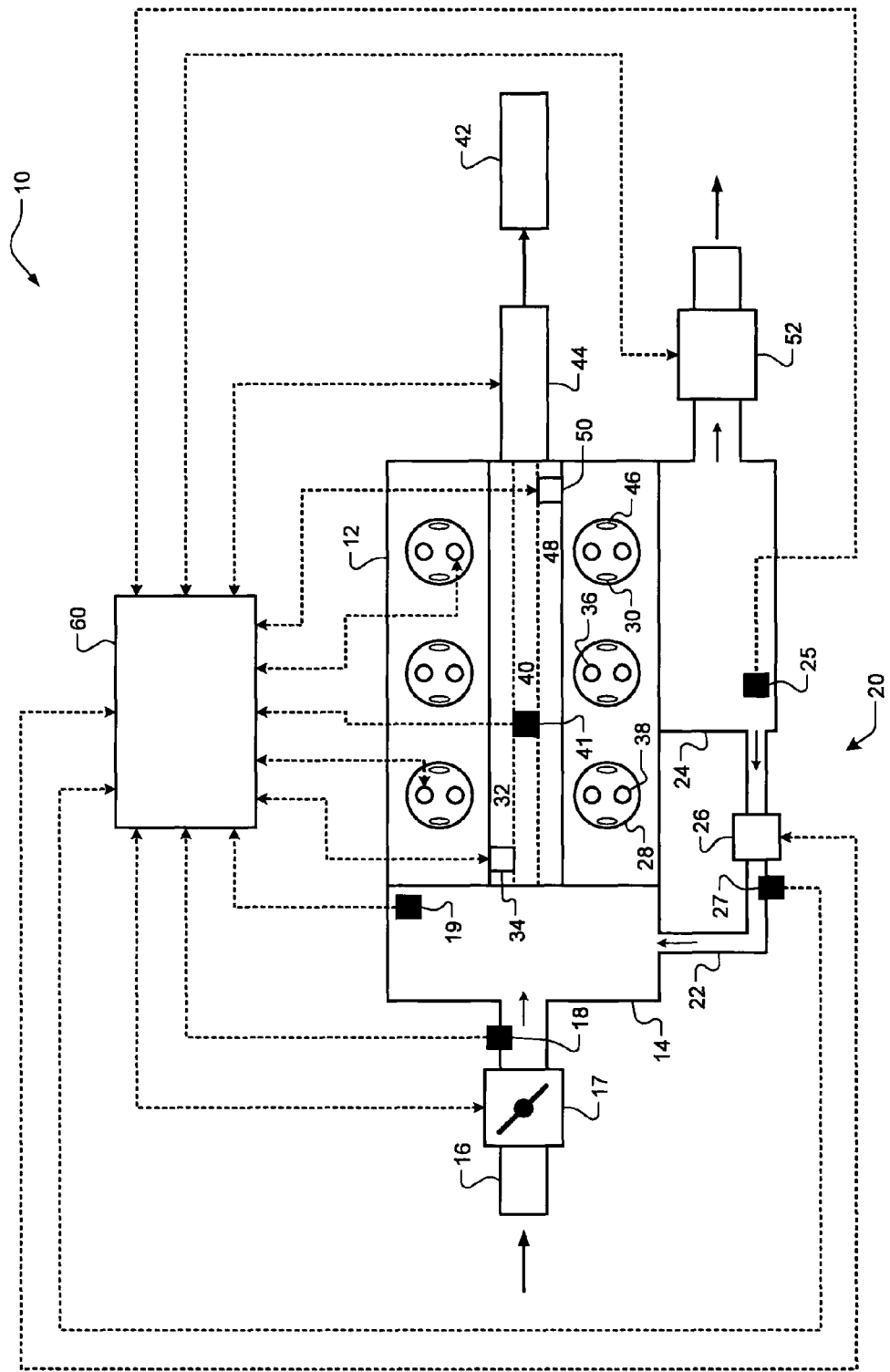
FIG. 1 is a functional block diagram of an example engine system according to one implementation of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Exhaust gas recirculation (EGR) involves recirculating exhaust gas for combustion during future engine cycles. EGR may include external EGR and/or internal EGR. External EGR involves recirculating exhaust gas from an exhaust manifold back into an intake manifold via an EGR system that may be regulated by an EGR valve. Internal EGR, on the other hand, results from overlap in intake and exhaust valve timing. More specifically, the overlap in intake and exhaust valve timing causes a portion of exhaust gas resulting from combustion to be trapped in a cylinder. The residual exhaust gas in the cylinder is then effectively recirculated for the next combustion event (i.e., combined with the next A/F charge). For example, intake and exhaust valve overlap may be controlled using dual independent camshaft phasers.

Operating an engine using both external and internal EGR allows for increased EGR. The increased EGR may decrease combustion temperatures and/or engine component temperatures. In addition, the increased EGR may suppress engine knock. The decreased temperatures and engine knock suppression may decrease fuel consumption resulting in increased fuel economy. During transient periods (i.e., when a throttle closes), internal EGR may increase and external EGR may decrease. The external EGR, however, may decrease at a slower rate than the internal EGR increases. The slower response of the external EGR is due to a transport delay of the EGR system. The transport delay may cause additional exhaust gas to enter the intake manifold after the EGR valve closes. The additional exhaust gas may cause a total amount of exhaust gas in the intake manifold to exceed a predetermined threshold. The excess exhaust gas may cause misfires and/or engine stalls.

Accordingly, a system and method for improved control of EGR are presented. The system and method may compensate for excess EGR due to the transport delay of an EGR system. The system and method may first determine whether an excess EGR condition is present. For example, the excess EGR condition may include transient periods when a throttle of the engine closes. Specifically, the system and method may estimate a total amount of EGR in the engine. The total amount of EGR in the engine includes a sum of an amount of EGR within cylinders of the engine and an amount of EGR flowing through the EGR system. The system and method may compare the estimated total amount of EGR in the engine to an EGR threshold.

Based on the comparison and a position of an EGR valve in the EGR system, the system and method may selectively control one of (i) an overlap of intake and exhaust valve timing in the engine and (ii) the EGR valve. Specifically, the system and method may command the overlap of the intake and exhaust valve timing to a minimum overlap when (i) the EGR valve is closed and (ii) the total amount of EGR in the engine is greater than the EGR threshold. Alternatively, the system and method may decrease an opening of the EGR valve when (i) the EGR valve is not closed and (ii) the total amount of EGR in the engine is greater than the EGR threshold. Lastly, the system and method may continue normal control of the EGR valve when (i) the EGR valve is not closed and (ii) the total amount of EGR in the engine is less than the EGR threshold.

Referring now to FIG. 1, an example engine system 10 includes an engine 12. The engine 12 may be a spark ignition (SI) engine, a diesel engine, a homogeneous charge compression ignition (HCCI) engine, or another suitable engine. The engine system 10 may also include additional components such as an electric motor and a battery system. The engine 12 draws air into an intake manifold 14 through an induction system 16 that may be regulated by a throttle 17. For example, the throttle 17 may be electrically controlled via electronic throttle control (ETC).

A mass air flow (MAF) sensor 18 measures a rate of airflow through the throttle 17 and into the intake manifold 14. The measured MAF may indicate a load on the engine 12. A manifold absolute pressure (MAP) sensor 19 measures a pressure within the intake manifold 14. The air in the intake manifold 14 is selectively combined with exhaust gas via an EGR system 20. The EGR system 20 includes an EGR line 22 that connects an exhaust manifold 24 to the intake manifold 14. An exhaust back pressure (EBP) sensor 25 measures a pressure within the exhaust manifold 24. An EGR valve 26 regulates the flow of exhaust gas from the exhaust manifold 24, through the EGR line 22, and into the intake manifold 14. While only the EGR valve 26 is shown, the EGR valve 26 may include a position sensor that measures a relative position of the EGR valve 26. An EGR flow sensor 27 measures a rate of exhaust gas flowing through the EGR valve 26 and into the intake manifold 14. The EGR flow rate, however, may also be based on a suitable model.

The air or air/exhaust mixture in the intake manifold 14 is distributed to a plurality of cylinders 28 through a plurality of intake valves 30, respectively. While six cylinders are shown, the engine 12 may include other numbers of cylinders. The intake valves 30 may be opened and closed by an intake camshaft 32. An intake camshaft phaser 34 may control the intake camshaft 32. Specifically, the intake camshaft phaser 34 may adjust a phase of the intake camshaft 32 thereby controlling a timing of the intake valves 30. The air or air/exhaust mixture is combined with fuel from a plurality of fuel injectors 36. The fuel injectors 36 may inject fuel via intake ports of the cylinders 28, respectively (port fuel injection), or directly into the cylinders 28, respectively (direct fuel injection).

The A/F mixture is compressed by pistons (not shown) within the cylinders 28 and combusted. Depending on the type of engine 12, a plurality of spark plugs 38 may either ignite the compressed A/F mixture (e.g., an HCCI engine) or assist in igniting the A/F mixture (e.g., a mixed combustion mode of an HCCI engine). Alternatively, the A/F mixture may be compressed until auto-ignition due to exceeding a critical pressure and/or temperature threshold (e.g., a diesel engine or an HCCI combustion mode of an HCCI engine). The combustion of the A/F mixture drives the pistons (not shown) which rotatably turn a crankshaft 40 and generate drive torque. An engine speed sensor 41 measures a rotational speed of the crankshaft 40 (e.g., in revolutions per minute, or RPM).

The drive torque may be transferred from the crankshaft 40 to a driveline 42 of a vehicle via a transmission 44. For example, the transmission 44 may be coupled to the crankshaft 40 via a fluid coupling such as a torque converter (not shown). Exhaust gas resulting from combustion may be expelled from the cylinders 28 through exhaust valves 46 and into the exhaust manifold 24. The exhaust valves 46 may be opened and closed by an exhaust camshaft 48. An exhaust camshaft phaser 50 may control the exhaust camshaft 48. Specifically, the exhaust camshaft phaser 50 may adjust a phase of the exhaust camshaft 48 thereby controlling a timing of the exhaust valves 46.

A portion of the exhaust gas may be trapped within the cylinders 28 due to timing overlap of the intake valves 30 and exhaust valves 46. As previously described, the exhaust gas in the exhaust manifold 24 may also be circulated back into the intake manifold 14 via the EGR system 20. A remainder of the exhaust gas (i.e., non-recirculated exhaust gas) in the exhaust manifold 24 may be treated by an exhaust treatment system 52 before being released into the atmosphere. For example, the exhaust treatment system 52 may include, but is not limited to, at least one of an oxidation catalyst (OC), a nitrogen oxide (NOx) adsorber/absorber, a selective catalytic reduction (SCR) system, a particulate matter (PM) filter, and a three-way catalytic converter.

A control module 60 controls operation of the engine system 10. The control module 60 may receive signals from the throttle 17, the MAF sensor 18, the MAP sensor 19, the EBP sensor 25, the EGR valve 26, the EGR flow sensor 27, the intake camshaft phaser 34, the fuel injectors 36, the spark plugs 38, the engine speed sensor 41, the transmission 44, the exhaust camshaft phaser 50, and/or the exhaust treatment system 52. The control module 60 may control the throttle 17, the EGR valve 26, the intake cam phaser 34, the fuel injectors 36, the spark plugs 38, the transmission 44, the exhaust cam phaser 50, and/or the exhaust treatment system 52. The control module 60 may implement the system or method of the present disclosure.

Figure 2:
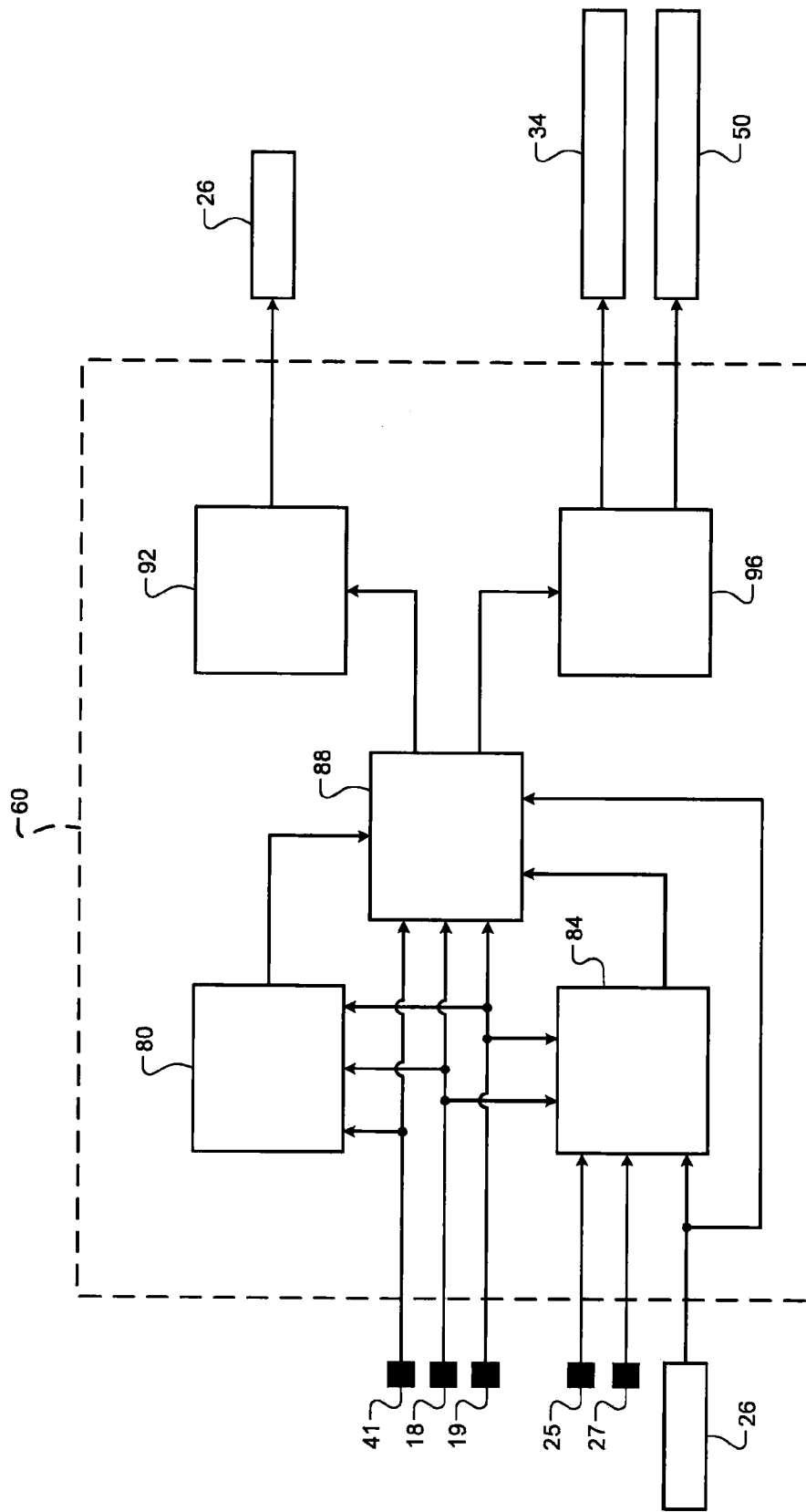
FIG. 2 is a functional block diagram of an example control module according to one implementation of the present disclosure.

Referring now to FIG. 2, an example of the control module 60 is shown. The control module 60 may include an internal EGR determination module 80, an external EGR determination module 84, an EGR control module 88, an EGR valve control module 92, and an engine valve control module 96.

The internal EGR determination module 80 determines an amount of internal EGR in the engine 12. The internal EGR determination module 80 may determine the amount of internal EGR based on air-per-cylinder (APC) and/or engine speed. For example, APC may be based on MAF and/or MAP. The MAF and the MAP may be measured by the MAF sensor 18 and the MAP sensor 19, respectively. The engine speed may be measured by the engine speed sensor 41. The amount of internal EGR may be further based on a predetermined amount of internal EGR for normal engine operation. In other words, the internal EGR determination module 80 may adjust the predetermined amount based on the APC and/or engine speed.

The external EGR determination module 84 determines an amount of external EGR flowing into the intake manifold 14 via the EGR system 20. The external EGR determination module 84 may determine the amount of external EGR based on MAF, a pressure differential, EGR valve position, and/or EGR flow rate. The MAF may be measured by the MAF sensor 18. The pressure differential represents a difference between the EBP and the MAP. The EBP and the MAP may be measured by the EBP sensor 25 and the MAP sensor 19, respectively. The EGR flow rate may be measured by the EGR flow sensor 27. The determined amount of external EGR may also be averaged with a previously determined amount of external EGR from a previous engine cycle.

The EGR control module 88 compares a sum of the determined amounts of internal EGR and external EGR to an EGR threshold. The EGR threshold may be predetermined. The EGR threshold, however, may also be adjusted based on APC and/or engine speed. As previously described, the APC may be determined based on the MAF and/or the MAP. The EGR control module 88 generates signals for the EGR valve control module 92 and the engine valve control module 96 based on the comparison and the EGR valve position. The signals are used by the EGR valve control module 92 and the engine valve control module 96 to control the EGR valve 26 and the intake and exhaust camshaft phasers 34 and 50, respectively.

When the comparison is less than or equal to the EGR threshold, the EGR control module 88 may command the EGR valve control module 92 to control the EGR valve 26 according to normal operation. For example, normal operation may include feedback-based control of the EGR valve position. Alternatively, when the comparison is greater than the EGR threshold and the EGR valve 26 is not closed, the EGR control module 88 may command the EGR valve control module 92 to control the EGR valve 26 to decrease the amount of external EGR. Rather, the EGR control module 88 may command the EGR valve control module 92 to decrease (i.e., close) the position of the EGR valve 26 thereby decreasing the amount of external EGR to compensate for the excess EGR in the intake manifold 14. The desired position of the EGR valve 26 may be based on a difference between the sum and the EGR threshold and/or the averaged amount of external EGR.

Alternatively, when the comparison is greater than the EGR threshold but the EGR valve 26 is closed, the EGR control module 88 may command the engine valve control module 96 to control the intake and exhaust valves (via intake and exhaust camshaft phasers 34 and 50, respectively) to decrease the amount of internal EGR. Rather, the EGR control module 88 may command the engine valve control module 96 to decrease an overlap of the intake and exhaust valve timings to a minimum overlap thereby decreasing the amount of internal EGR. The minimum valve overlap also allows for the engine 12 to consume the excess EGR in the intake manifold 14 during a number of future combustion cycles. For example, the number of future combustion cycles may be based on the minimum valve overlap and the difference between the sum and the EGR threshold. After the number of combustion cycles, the control module 60 may resume normal operation and therefore normal control of the EGR valve 26 and the intake and exhaust camshaft phasers 34 and 50.

Figure 3:
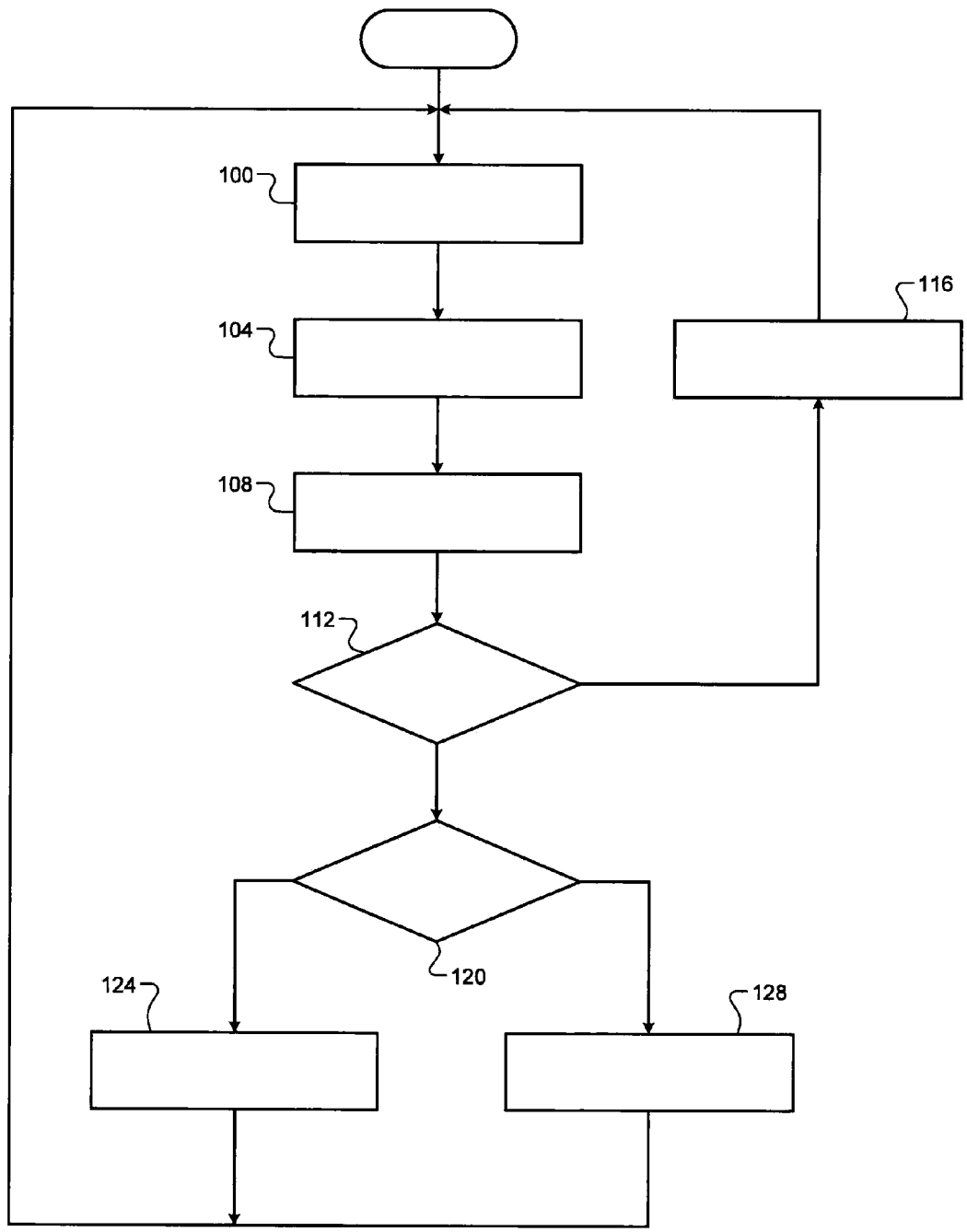
FIG. 3 is a flow diagram illustrating an example method of controlling exhaust gas recirculation (EGR) according to one implementation of the present disclosure.

Referring now to FIG. 3, an example method for controlling EGR begins at 100. At 100, the control module 60 may estimate the amount of EGR within cylinders 28 of the engine 12 ($EGR_{INT}$). At 104, the control module 60 may estimate the amount of EGR flowing through the EGR system 20 ($EGR_{EXT}$). At 108, the control module 60 may calculate the total EGR ($EGR_{TOT}$) in the engine 12 by summing the estimated amounts of EGR $EGR_{INT}$ and $EGR_{EXT}$. At 112, the control module may determine whether the total amount of EGR $EGR_{TOT}$ is greater than an EGR threshold ($EGR_{TH}$). If false, control may proceed to 116. If true, control may proceed to 120.

At 116, the control module 60 continues to control the EGR valve 26 according to normal operation. Control may then return to 100. At 120, the control module 60 may determine whether the EGR valve 26 is closed. If true, control may proceed to 124. If false, control may proceed to 128. At 124, the control module 60 may command the overlap of the intake and exhaust valve timing to a minimum valve overlap. Control may then return to 100. At 128, the control module 60 may decrease an opening of the EGR valve 26. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, the control system comprising:
 a first module that estimates a total amount of exhaust gas recirculation (EGR) in the engine, wherein the total amount of EGR includes (i) EGR within cylinders of the engine and (ii) EGR flowing through an EGR system of the engine; and
 a second module that selectively controls an overlap of intake and exhaust valve timing in the engine based on (i) a position of an EGR valve of the EGR system and (ii) a comparison of the estimated total amount of EGR in the engine and an EGR threshold,
 wherein the second module commands the overlap of the intake and exhaust valve timing in the engine to a minimum overlap for a predetermined number of combustion cycles prior to commanding the overlap of the intake and exhaust valve timing in the engine to another overlap that is greater than the minimum overlap, and wherein the predetermined number of combustion cycles is based on (i) internal EGR while at a minimum overlap of intake and exhaust valve timing and (ii) a difference between the total amount of EGR and the EGR threshold.

2. The control system of claim 1, wherein the second module commands the overlap of the intake and exhaust valve timing in the engine to a minimum overlap in response to (i) the position of the EGR valve being in a closed position and (ii) the estimated total amount of EGR in the engine being greater than the EGR threshold.

3. The control system of claim 2, wherein the minimum overlap is one of (i) predetermined and (ii) determined based on mass air flow (MAF), manifold absolute pressure (MAP), and engine speed.

4. The control system of claim 1, further comprising a third module that selectively controls the EGR valve based on (i) the position of the EGR valve and (ii) the comparison of the estimated total amount of EGR in the engine and the EGR threshold.

5. The control system of claim 4, wherein the third module controls the EGR valve according to normal operation in response to (i) the EGR valve not being in a closed position and (ii) the estimated total amount of EGR in the engine being less than the EGR threshold.

6. The control system of claim 4, wherein the third module decreases an opening of the EGR valve in response to (i) the EGR valve not being in a closed position and (ii) the estimated total amount of EGR in the engine being greater than the EGR threshold.

7. The control system of claim 1, further comprising a fourth module that estimates the amount of EGR within the cylinders of the engine based on at least one of mass air flow (MAF), manifold absolute pressure (MAP), and engine speed.

8. The control system of claim 1, further comprising a fifth module that estimates the amount of EGR flowing through the EGR system based on at least one of mass air flow (MAF), a difference between exhaust back pressure (EBP) and manifold absolute pressure (MAP), the position of the EGR valve, and a flow rate through the EGR system.

9. The control system of claim 1, wherein the first module estimates the total amount of EGR during a transient period defined by a throttle of the engine closing.

10. The control system of claim 1, wherein the EGR threshold is one of (i) predetermined and (ii) determined based on mass air flow (MAF) and engine speed.

11. A method for controlling an engine, the method comprising:
estimating a total amount of exhaust gas recirculation (EGR) in the engine, wherein the total amount of EGR includes (i) EGR within cylinders of the engine and (ii) EGR flowing through an EGR system of the engine;
selectively controlling an overlap of intake and exhaust valve timing in the engine based on (i) a position of an EGR valve of the EGR system and (ii) a comparison of the estimated total amount of EGR in the engine and an EGR threshold; and
commanding the overlap of the intake and exhaust valve timing in the engine to a minimum overlap for a predetermined number of combustion cycles prior to commanding the overlap of the intake and exhaust valve timing in the engine to another overlap that is greater than the minimum overlap,
wherein the predetermined number of combustion cycles is based on (i) internal EGR while at a minimum overlap of intake and exhaust valve timing and (ii) a difference between the total amount of EGR and the EGR threshold.

12. The method of claim 11, further comprising commanding the overlap of the intake and exhaust valve timing in the engine to a minimum overlap in response to (i) the position of the EGR valve being in a closed position and (ii) the estimated total amount of EGR in the engine being greater than the EGR threshold.

13. The method of claim 12, wherein the minimum overlap is one of (i) predetermined and (ii) determined based on mass air flow (MAF), manifold absolute pressure (MAP), and engine speed.

14. The method of claim 11, further comprising selectively controlling the EGR valve based on (i) the position of the EGR valve and (ii) the comparison of the estimated total amount of EGR in the engine and the EGR threshold.

15. The method of claim 14, further comprising controlling the EGR valve according to normal operation in response to (i) the EGR valve not being in a closed position and (ii) the estimated total amount of EGR in the engine being less than the EGR threshold.

16. The method of claim 14, further comprising decreasing an opening of the EGR valve in response to (i) the EGR valve not being in a closed position and (ii) the estimated total amount of EGR in the engine being greater than the EGR threshold.

17. The method of claim 11, further comprising estimating the amount of EGR within the cylinders of the engine based on at least one of mass air flow (MAF), manifold absolute pressure (MAP), and engine speed.

18. The method of claim 11, further comprising estimating the amount of EGR flowing through the EGR system based on at least one of mass air flow (MAF), a difference between exhaust back pressure (EBP) and manifold absolute pressure (MAP), the position of the EGR valve, and a flow rate through the EGR system.

19. The method of claim 11, further comprising estimating the total amount of EGR during a transient period defined by a throttle of the engine closing.

20. The method of claim 11, wherein the EGR threshold is one of (i) predetermined and (ii) determined based on mass air flow (MAF) and engine speed.

* * * * *